United States Patent [19]

Egami et al.

[11] Patent Number: 4,675,909
[45] Date of Patent: Jun. 23, 1987

[54] BINARY CHARACTER SIGNAL PRODUCING APPARATUS

[75] Inventors: Kazunari Egami; Tetsuo Umeda; Yasuo Nishijima, all of Tokyo, Japan

[73] Assignee: NEC Corporation, Japan

[21] Appl. No.: 699,811

[22] Filed: Feb. 8, 1985

[30] Foreign Application Priority Data

Feb. 9, 1984 [JP] Japan .................................. 59-24038

[51] Int. Cl.$^4$ .............................................. G06K 9/38
[52] U.S. Cl. ....................................... 382/50; 382/18; 382/51
[58] Field of Search ........................ 382/50, 51, 52, 53, 382/18

[56] References Cited

U.S. PATENT DOCUMENTS

| | | | |
|---|---|---|---|
| 3,466,603 | 9/1969 | Shelton, Jr. ............................ | 382/51 |
| 3,479,642 | 11/1969 | Bartz ..................................... | 382/51 |
| 3,668,637 | 6/1972 | Sakai et al. ............................. | 382/50 |
| 3,705,383 | 12/1972 | Frayer .................................... | 382/18 |
| 4,064,484 | 12/1977 | Mese et al. ............................. | 382/53 |
| 4,566,125 | 1/1986 | Clunn ..................................... | 382/50 |

Primary Examiner—Leo H. Boudreau
Assistant Examiner—Joseph Mancuso
Attorney, Agent, or Firm—Laff, Whitesel, Conte & Saret

[57] ABSTRACT

A character recognition circuit slices the character signal received from an optical scanner and counts a number of black bits at multiple levels. The number of black bits are normalized in accordance with the character row length. A pair of level judging circuits responds to the normalized black bits at the respective multiple levels to derive slicing levels for both the character and the background. Responsive thereto a binary signal is produced in accordance with the slice level. Thus, the differences in the background signals do not have an effect upon the recognition of the character signals.

10 Claims, 19 Drawing Figures

CONNECTION CONDITION (1) $|X_i - X_j| \leq$ (SPACE PARAMETER)

(2) $Y_i - H_i < Y_j$ ($Y_i \geq Y_j$)

(3) $Y_i > Y_j - H_j$ ($Y_i < Y_j$)

NEWLY APPEARING BLACK MESH

*FIG. 10*

| LINE NUMBER | RENEWED X | RENEWED Y | RENEWED H | LENGTH |
|---|---|---|---|---|
| 1 | $X_6$ | $Y_{16}$ | $H_{16}$ | $L_1$ |
| 2 | $X_4$ | $Y_{24}$ | $H_{24}$ | $L_2$ |
| 3 | $X_3$ | $Y_{33}$ | $H_{33}$ | $L_3$ |
| 4 | $X_9$ | $Y_{49}$ | $H_{49}$ | $L_4$ |
| 5 | 0 | 0 | 0 | 0 |

*FIG. 11*

BINARY CHARACTER SIGNAL PRODUCING APPARATUS

BACKGROUND OF THE INVENTION

The present invention relates to character recognition apparatus and, more particularly, to apparatus for producing a binary signal to be used for character recognition responsive to a character signal which is obtained by an optical scanner or the like.

In a character recognition apparatus, generally speaking, a character signal obtained from an optical scanner is sliced at a suitable threshold level (slice level) to produce a binary signal. Character recognition is conducted by making use of that binary signal. However, the suitable slice level varies with the density and size of the characters written on a document and/or with the background of the document. As a result, a failure in determining the suitable slice level leads to a reduction in the recognition percentage or to an erroneous recognition.

In a first prior art procedure, there is a method of dynamically determining a slice level. An analog character signal obtained from a scanner is converted into a digital character signal at multiple levels, e.g., four to sixteen levels. An average level of a background in a small area surrounding a point to be made binary is determined as the slice level. In a second prior art procedure, a plurality of binary signals are produced in accordance with a plurality of different slice levels. Recognition is repeated in response to respective binary signals, to seek an appropriate recognized conclusion. Since the slice levels are determined in a respective microscopic area, according to the first method, a pattern of the background may be erroneously taken up as the character pattern, when a reflection rate of the background varies in a complex manner. The second method is superior to the first in that the character recognitions are conducted at the various slice levels. The final result is outputted, while compensating for the defect of the first method. However, since the recognitions have to be repeated at the various slice levels, the second method has a defect because a long time period is required for the recognitions. On the other hand, for high speed operations, it is conceivable to use a plurality of recognition units. However, this raises the cost for hardware.

SUMMARY OF THE INVENTION

It is, therefore, an object of the present invention to provide a binary character signal producing apparatus which is capable of eliminating the influence of level fluctuations in the fine background in a scanning area, eliminating the influence of the background pattern in the scanning area, and eliminating the influence of level determination even if the number of characters in the scanning area is varied drastically.

According to the invention, a binary character signal producing apparatus comprises an A/D converter which receives a character signal, produced by scanning a predetermined scanning area. The A/D converter converts the character signal into a digital character signal having multiple levels. The scanning area is expressed by a plurality of two dimensional meshes. A character row length measuring circuit perceives the character signal for detecting the length of the character row contained in the scanning area. A black bit number counting circuit receives the digital signal from the A/D converter for counting the number of the black bits at the respective multiple levels within the scanning area. A normalizing circuit normalizes the number of the black bits at the respective multiple levels in accordance with the character row length. A first level judging circuit responds to the normalized number of the black bits at the respective multiple levels for deriving a level corresponding to a first predetermined number as a character slice level. A second level judging circuit also responds to the number of the black bits counted by the black bit counting circuit at the respective multiple levels for deriving a background slice level corresponding to a second predetermined number. A slice level determining circuit determines a slice level to obtain a binary character signal in response to the character slice level and the background slice level delivered from the first and second level determining circuits. A binary circuit produces the binary character signal in accordance with the slice level which is determined by the slice level determining circuit.

DESCRIPTION OF THE PREFERRED EMBODIMENT

Figure 1:
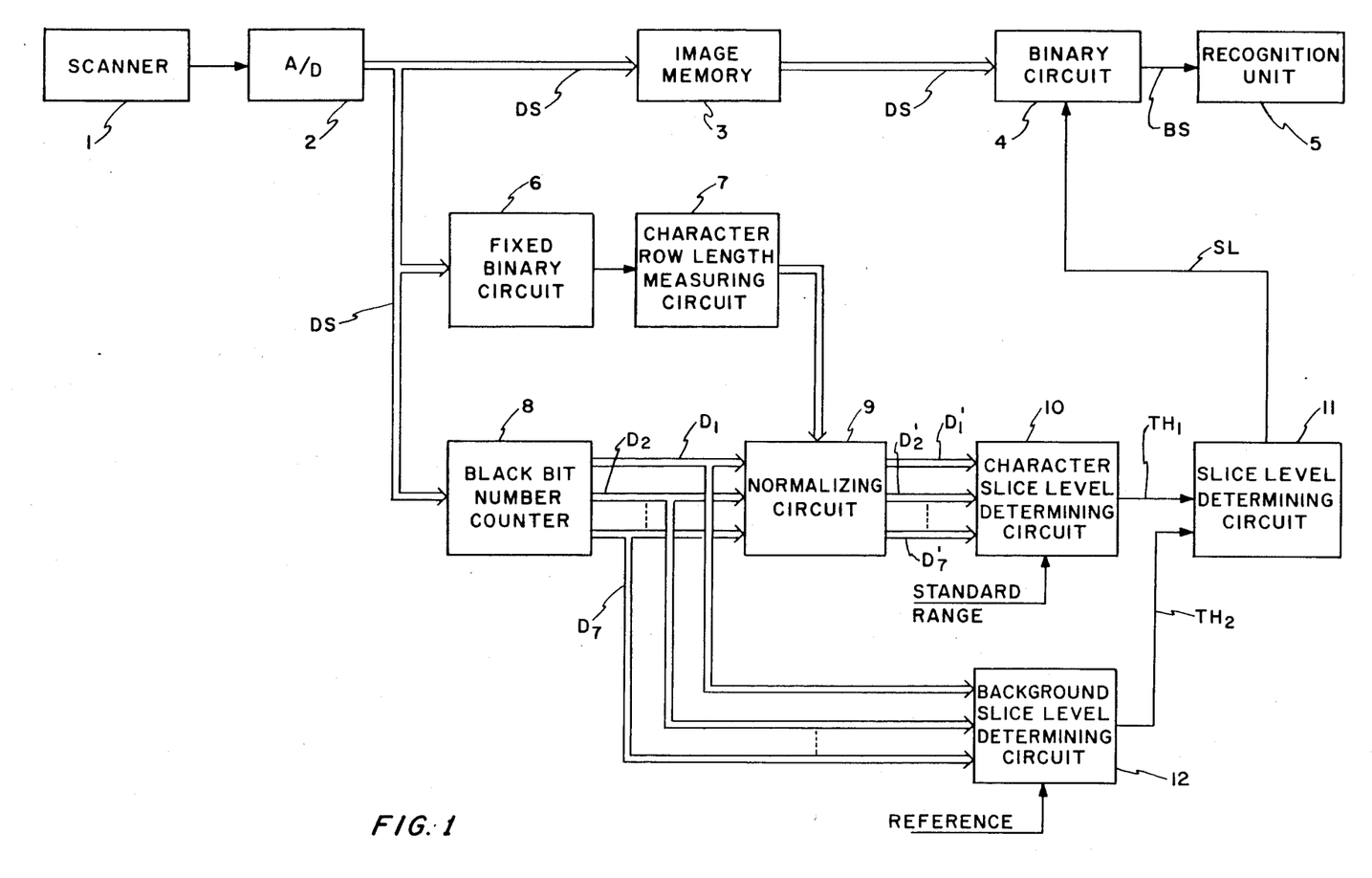
FIG. 1 is a block diagram showing one embodiment of the present invention.

FIG. 1 is a block diagram showing one embodiment of the present invention. As shown, a character signal picked up in a certain scanning region by an optical scanner 1 is converted by an A/D converter 2 into a digitial character signal, which has multiple levels for each of a plurality of meshes in the scanning area, such as, a digital character signal DS of 8 bits (having 256 steps). This digital character signal DS is stored in an image memory 3. The digital character signal stored in the image memory 3 is read out, after the most proper and correct slice level SL is determined. The read out signal is converted into a binary character signal BS by a binary circuit 4 in accordance with that slice level SL.

The binary character signal is, then, supplied to a recognition unit 5.

Next, a circuit portion for determining the most proper and correct slice level will be explained. The digital character signal DS delivered from the A/D converter 2 is supplied to a fixed binary circuit 6 having a fixed slice level. A binary signal is produced by circuit 6, and, then, the binary signal is applied to a character row length measuring circuit 7. This character row length measuring circuit 7 measures the total length of character trains contined in the scanning area in response to the binary signal delivered from the fixed binary circuit 6.

On the other hand, the digital character signal DS from the A/D converter 2 is supplied to a black bit number counter 8, in which the number of black bits, (i.e., the number of meshs of black) is counted for each of the seven bits (for each level). The counted numbers for the respective bits are delivered as data $D_1$ to $D_7$ and supplied to a normalizing circuit 9. In this normalizing circuit 9, normalized black bit numbers $D_1'$ to $D_7'$ are determined by dividing the data $D_1$ to $D_7$ by the character row length data from the character row length measuring circuit 7 and are applied to a character slice level determining circuit 10. This character slice level determining circuit 10 examines the respective numbers (i.e., the normalized black bit numbers $D_1'$ to $D_7'$) for the respective bits and delivers one corresponding level, at which the corresponding normalized black bit number enters a predetermined standard range, as a character slice level $TH_1'$ which is supplied to a slice level determining circuit 11.

On the other hand, the black bit number counter 8 supplies the respective black bit numbers to a background level judging circuit 12, in which a slice level $TH_2$ is selected in accordance with a predetermined range and is supplied to the slice level determining circuit 11. This slice level $TH_2$ is one which prevents a background pattern signal. The slice level determining circuit 11 compares the two slice levels $TH_1$ and $TH_2$ to output the final slice level SL.

Figures 2A, 2B, 2C, 2D:
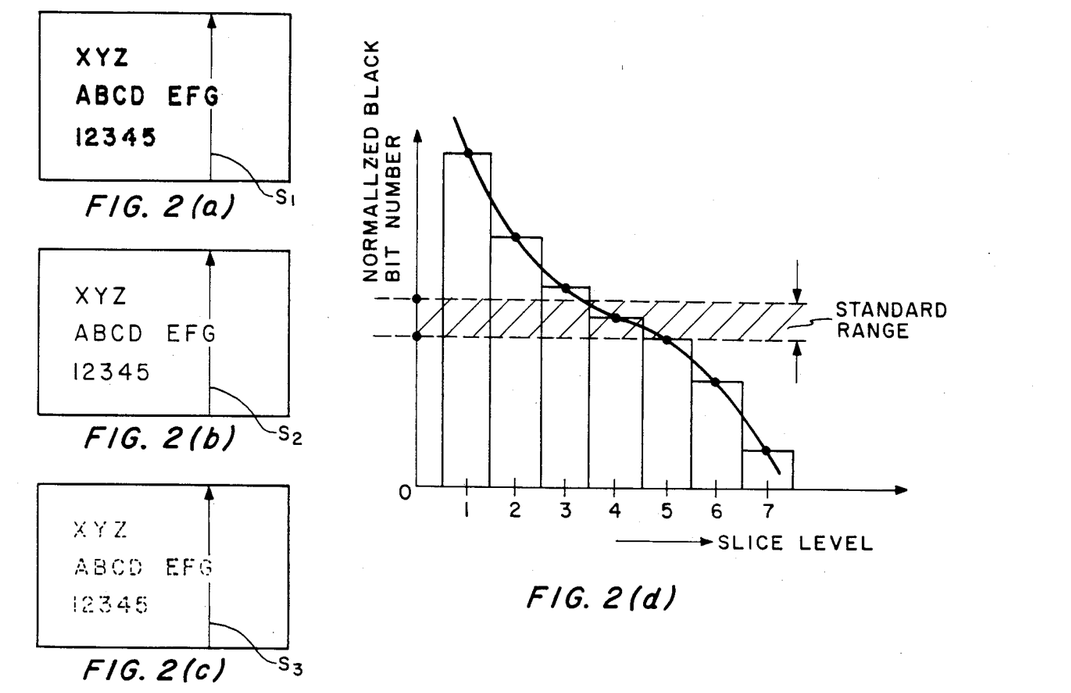
FIG. 2(a) to FIG. 2(d) show diagrams which help to explain the relationships between slice levels and resultant character patterns and the relationships between the slice levels and the number of normalized black bits.

The operations of the circuits thus constructed will be explained in detail. FIGS. 2(a), (b) and (c) shows diagrams explaining general changes of a binary pattern due to difference slice levels in a scanning area. The pattern is exemplified by a case having seven slice levels. FIG. 2(a) shows the case in which the slicing is conducted at a level "1" for a higher density. In this case, the characters are defaced so that they may be partially unreadable. FIG. 2(b) shows the case in which a binary pattern is obtained at a level "4" and which is assumed to provide the most proper and correct pattern. FIG. 2(c) shows the case in which the slicing is conducted at a level "7" for a lower density and in which the characters become partially blurred.

FIG. 2(d) is a graph showing a general change of the normalized black bit numbers $D_1'$ to $D_7'$ at the respective levels. FIG. 2(d) shows the characteristic of a monotonously reducing tendency in which the numbers of black bits are gradually reduced in accordance with the respective levels, i.e., from the level "1" to the level "7". The hatched area in FIG. 2(d) indicates the standard range of the normalized black bit number, which corresponds to the most proper slice level. The character slice level judging circuit 10 consecutively examines the black bit number with respect to the levels, beginning with the level "1". Circuit 10 delivers a signal identifying a first level entering the standard range (hatched range) as the character slice level. In the example shown in FIG. 2(d), the level "4" first entering the reference range is delivered as the character slice level $TH_1$.

Figures 3A, 3B, 3C, 3D:
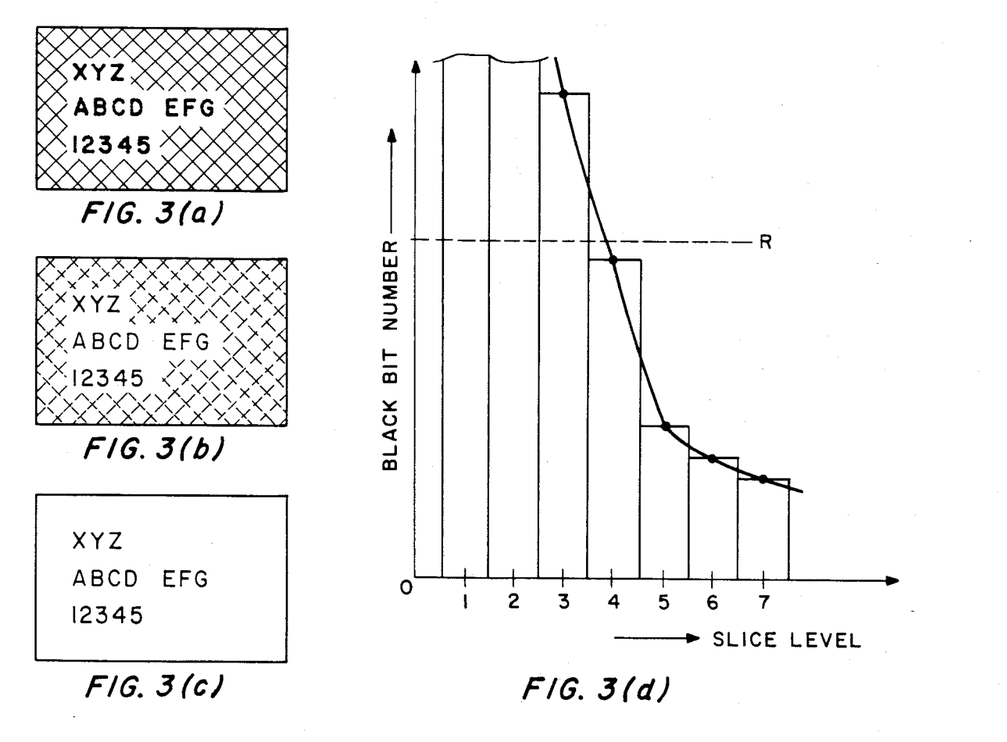
FIG. 3(a) to FIG. 3(d) show diagrams which help to explain the relationships between the slice levels and background levels and the relationships between the slice levels and the black bit number.

On the other hand, the background level judging circuit 12 judges the background level from the black bit number data $D_1$ to $D_7$ in the scanning area. FIGS. 3(a), (b) and (c) explain the situation of the background level detection. FIGS. 3(a), (b) and (c) show binary patterns of the scanning area, which are obtained when sliced by level "2", level "4" and level "5". FIG. 3(d) shows a characteristic of the changes in the black bit numbers $D_1$ to $D_7$. The background color level judging circuit 12 checks those black bit numbers consecutively with respect to the levels, from the level "1" to the level "7" to search out the one level which is equal to or lower than a background reference R. The background level judging circuit 12 delivers a background level which is lower by one than the level which first becomes lower than the reference R. In this case, the level "4" is derived as the background level.

Next, the slice level determining circuit 11 determines the most proper level in response to the character slice level $TH_1$ and the background slice level $TH_2$ and delivers an identification of the proper level to the binary circuit 4. The level determining circuit 11 delivers the character slice level $TH_1$ as the most proper slice level SL when it is equal to or higher than the background slice level $TH_2$. On the contrary, when the background slice level $TH_2$ is higher than the character slice level $TH_1$, the level determining circuit 11 identifies the level which is higher by one step than the background slice level $TH_2$ as the most proper level SL. The binary circuit 4 produces the binary character signal BS by slicing the digital signal DS by the most proper slice level SL.

Figure 4:
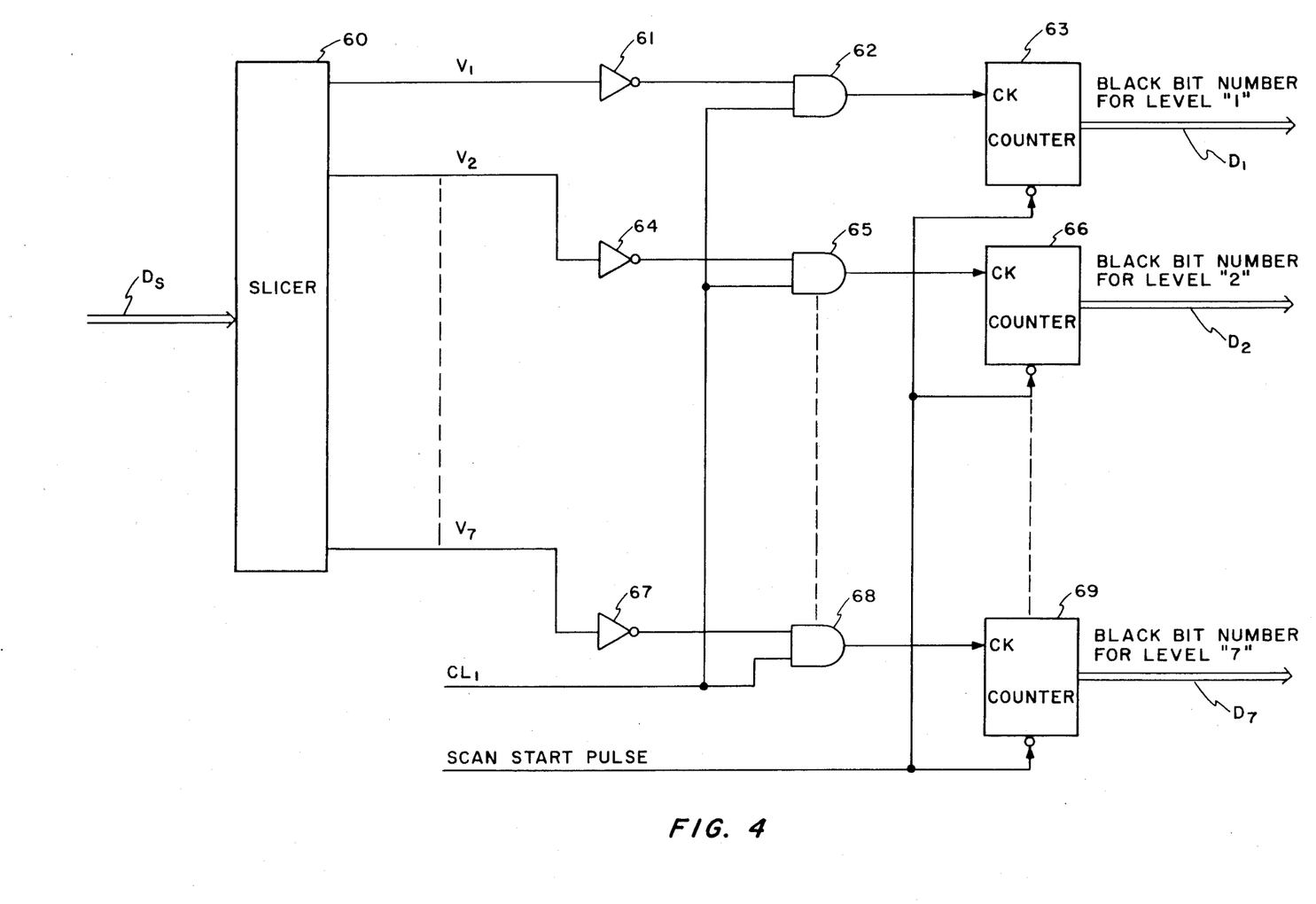
FIG. 4 is a diagram showing the construction of a block bit number counting circuit of FIG. 1.
Figure 5:
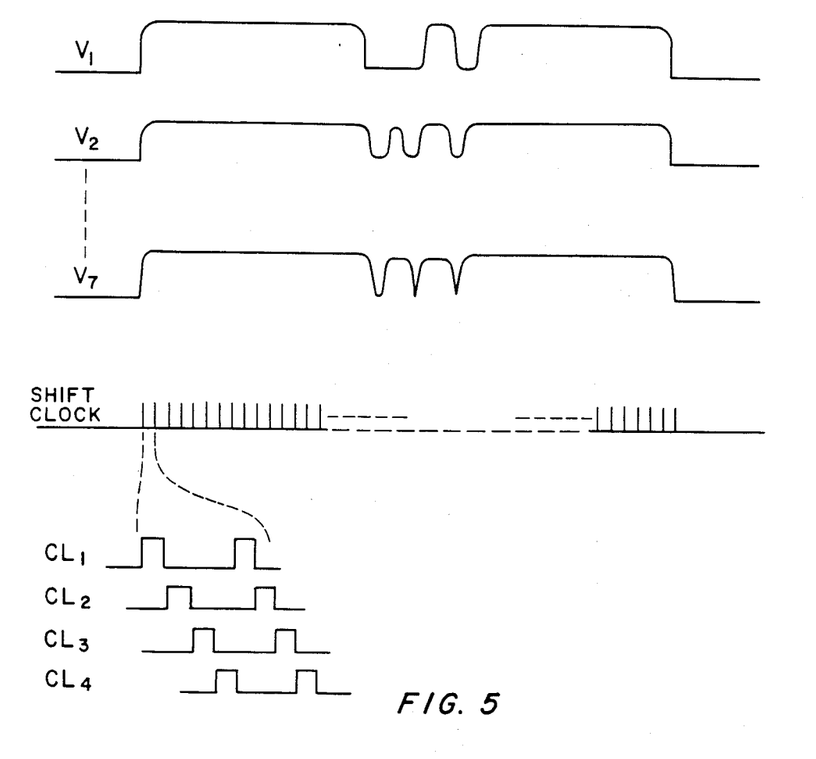
FIG. 5 shows a time chart for explaining the operations of the block bit number counting circuit of FIG. 4.

FIG. 4 shows the block diagram of the black number bit counter 8 (in FIG. 1). The pattern (video) signal corresponding to scanning lines S1, S2 and S3 of FIGS. 2(a), (b) and (c) are sliced by a slicer 60 to produce signals $V_1$, $V_2$ and $V_3$ as shown in FIG. 5. The video signal $V_1$ is inverted by an inverter 61 to have a logical level "1" for a black bit, and this logical level is supplied to an AND gate 62. When the video signal is at the logical level "1", AND gate 62 conducts and a counter 63 countes a clock pulse CL1. The video signal $V_2$ is sliced at the level "2" and is supplied through an inverter 64 and a gate 65 to a counter 66 so that the counter 66 counts the black bits. Likewise, the black bits are counted, up to the video signal sliced by the level "7". Incidentally, the black bit counters 63, 66 and 69 are cleared at a scan start timing, i.e., the first timing when the video signal is written into the image memory 3.

Figure 6:
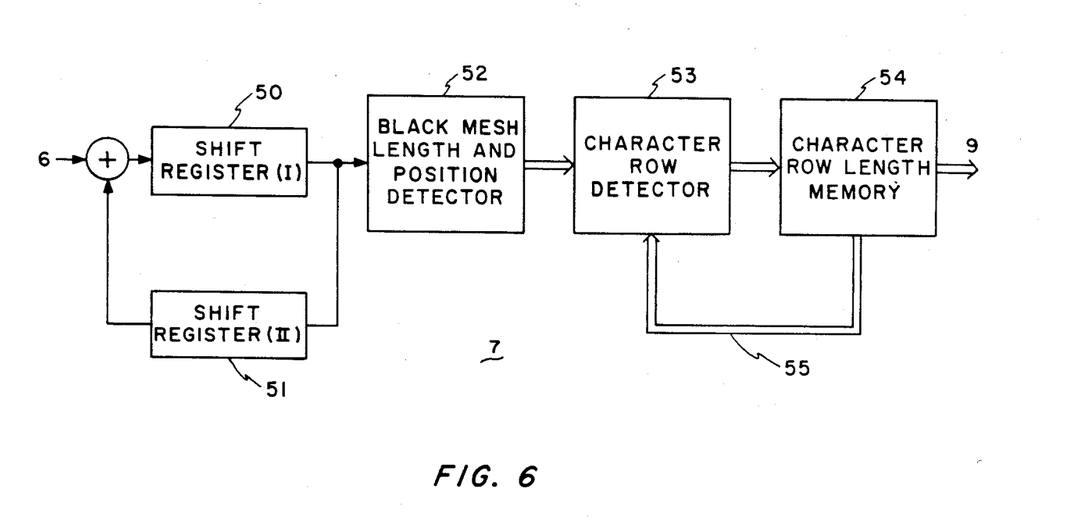
FIG. 6 is block diagram slowing the construction of a character row length measuring circuit.

FIG. 6 is a block diagram showing the construction of the character row length measuring circuit 7 (FIG. 1). In this Figure, a shift register (I) 50 has a capacity for storing one scanning period of the binary pattern signal delivered from the fixed binary circuit 6. An adder at the input of shift register 50 receives the output of the fixed binary circuit 6 and the output of a shift register (II) 51 for logically adding them. The shift register (II) 51 has the same capacity that the shift register (I) 50 has. The logical sum of the binary pattern signals for several scanning periods is taken by the circuitry thus far described. This circuitry compensates for the disadvantage which is caused by the slicing operation at the one fixed level in the fixed binary circuit 6.

For the measurement of the character row length, any one of the slice levels has to be initially adopted before the determination of the most proper slice level can be made. In order to avoid the influence from the background level, at this time, such an initially selected level must be usually selected so that the background pattern will drop out. However, in practice, the character pattern signal may become partially blurred to make it impossible to normally detect the character train. In order to prevent this possibility, a plurality of the binary pattern signals for the several scanning operations are added in the embodiment so that the influence from the blur of the characters pattern signal is compensated by a "grading effect".

The output of the shift register (I) 50 is supplied to a black mesh length and position detector 52, in which the position and length of the black mesh portion in one scanning operation are detected. In accordance with the detection results, a character row detector 53 reads out the black mesh data 55 which was derived during a previous scanning operation of the preceding row. This previous data is stored in a character row length memory 54. Detector 53 examines the connection relationship therebetween.

The character row length is renewed in the case of the connection, but a new row length is registered as a new character row in the character row length memory 54 in the case of disconnection. (The words "connection" and "disconnection" refer to how well successive black areas align, which is a means for determining whether the black areas fall within a common character row.) The operations thus far described are continued until the scanning operation terminates. When the scanning operation is completed, the last input multi-level pattern signal is stored in the image memory 3. Then, the slice level judging operation is started.

Figure 7:
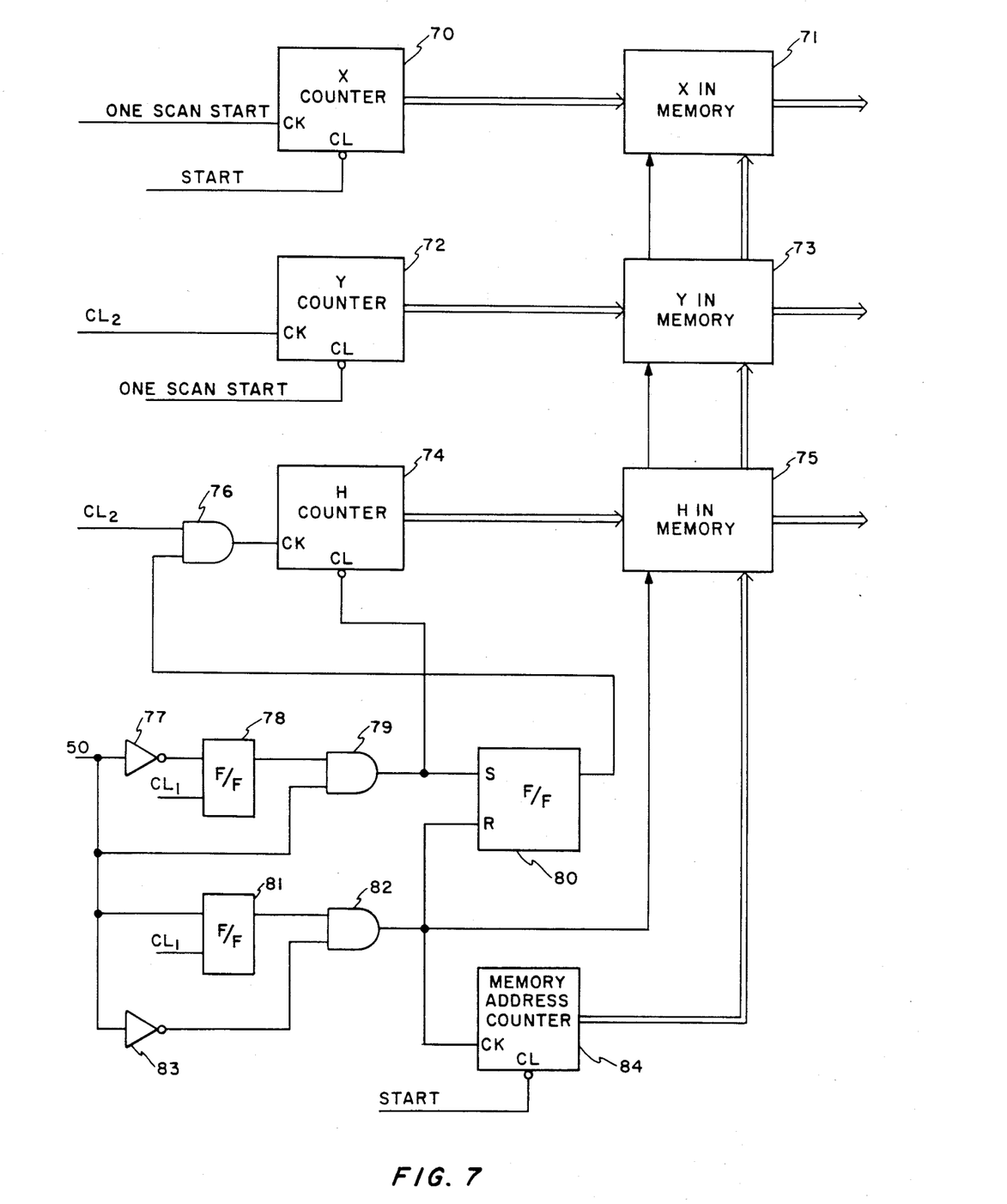
FIG. 7 is a diagram showing the construction of a black mesh position and length detector of FIG. 6.

FIG. 7 shows the detail of the black mesh position and length detector 52 of FIG. 6. The video signal, which the shift register (I) 50 and the shift register (II) 51 of FIG. 6 have compressed during a predetermined number of scanning operations, is shifted responsive to the shift clock pulse train CL1 into a flip-flop 78, via an inverter 77, as shown in FIG. 7. Here, the flip-flop 78 stores the fact that a white mesh of the video signal has been present.

A black mesh of the video signal is detected, when it appears at a subsequent shift clock timing, at the leading edge of the black mesh portion, that is, at a point in which an AND gate 79 changes the video signal from the white mesh to the black mesh, so that a flip-flop 80 is set. When it is at the logical value "1", the output of this flip-flop 80 is given to an AND gate 76 as a gate signal for counting the length of the black mesh portion. A black mesh length counter (i.e., an H counter) 74 conducts its counting operations while the gate 76 is on. The length of the black meshs in the scanning direction, i.e., the height of the character portion is counted.

The video signal is further given as an input to a flip-flop 81, which stores the fact that the black mesh have appeared. When a white mesh of the video signal appears at the subsequent shift clock timing, it is detected by an AND gate 82 as the trailing edge of the black mesh, i.e., as the point, in which the video signal is changed from the black mesh to the white mesh.

Figure 8:
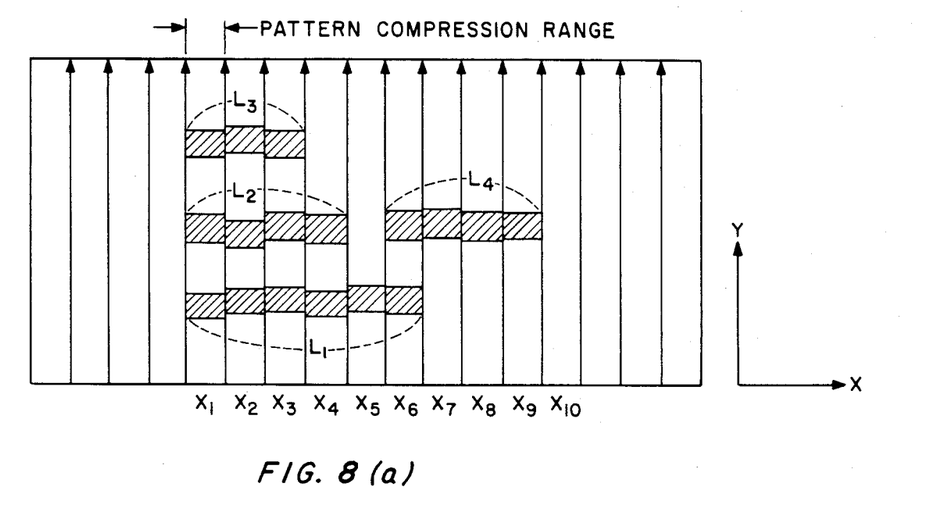
FIG. 8(a), FIG. 8(b) and FIG. 8(c) show the operations of the black mesh position and length detector of FIG. 7.

In response to this trailing edge signal, the H-counter gate flip-flop 80 is reset so that the H-counter 74 stops its length (or character height) counting operation. Moreover, the counted value of the length (or height) at that time is set in an H in memory 75. On the other hand, the data of an X-coordiante counter 70 and a Y-coordinate counter 72 of that black mesh trailing edge are set in an X in-memory 71 and a Y in-memory 73, respectively. Moreover, after the data have been set, a memory address counter 84 is counted up. The operations thus far described are conducted from the start to the end of the scanning operation so that the black mesh position length data from the image pattern of FIG. 2 are set in the memories 71, 73 and 75, as shown in FIGS. 8(a), (b) and (c). These memories are set to store the black mesh data sequentially in the order of the data generation.

Figure 9:
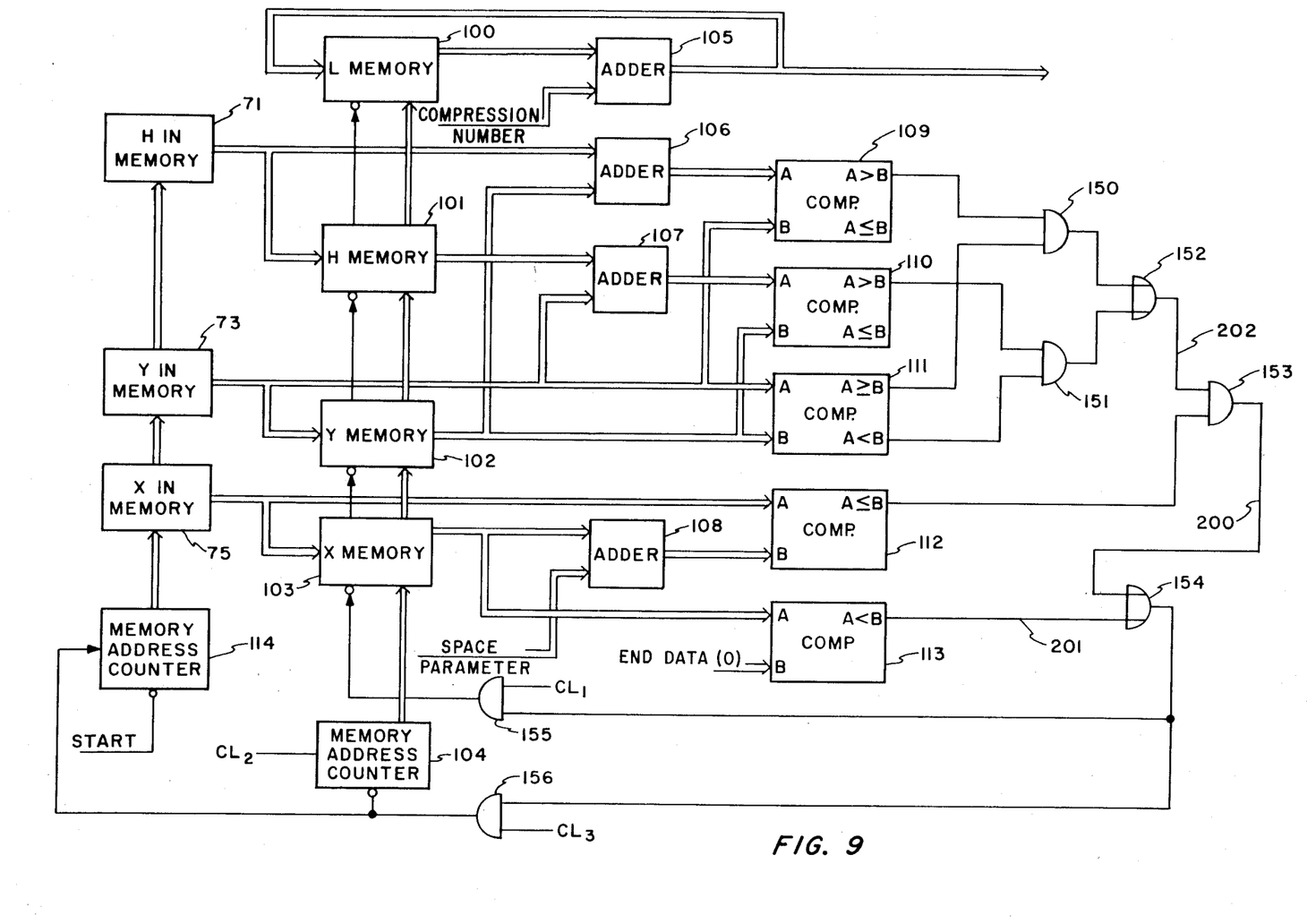
FIG. 9 is a diagram showing the construction of the character row length measuring circuit of FIG. 6.

FIG. 9 shows the detail of the character row detector 53 (FIG. 6). The detected black mesh position and length data (as shown in FIG. 8(c)) are set in the memories 71, 73 and 75. The subsequent character row detector 53 is started when the scanning operation is completed.

First, the character row length memory 54 (FIG. 6) is cleared to zero at the start of the circuit operation. The character row length memory is composed of a character row length memory (or an L-memory) 100, a character row height memory (or an H-memory) 101, a character row Y-coordinate member (or a Y-memory) 102 and a character row X-coordinate member (or an X-memory) 103. When the character row detection is started, memory address counters 114 and 104 are cleared to zero.

Figure 10:
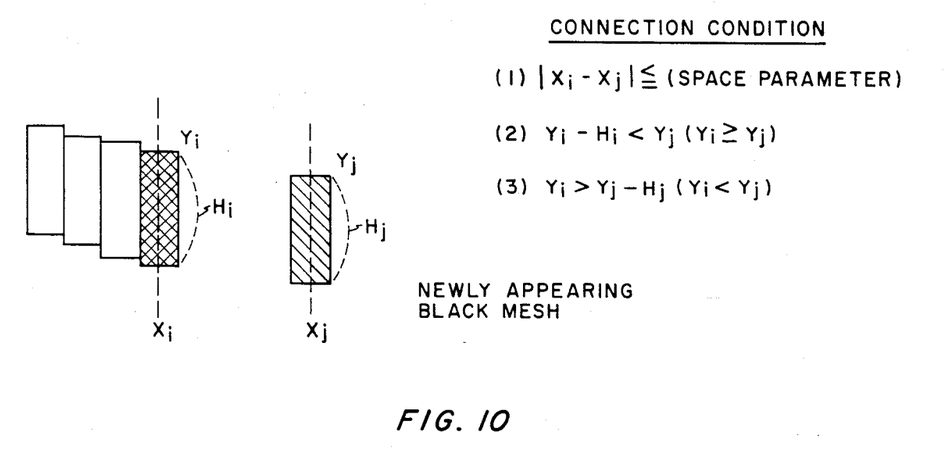
FIG. 10 is a diagram for explaining the operations of the character row length measuring circuit of FIG. 9.

The black mesh position and length data (as shown in FIG. 8(c)) are first read out from the first black mesh. On the other hand, from the character row length L-memory 100, the H-memory 101, the Y-memory 102 and X-memory 103, first character row data (L, H, Y and X) are read out during the period of a clock pulse CL2. Moreover, the connection of the input black meshes and the character row data are examined. The connection condition of the two is shown in FIG. 10. Specifically, the overlap in the Y-coordinate direction between the black mesh at the rightmost end of the character row and a newly appearing black mesh is examined so that the character row is either connected so that it belongs to the same line; or, it is judged as belonging in a new line which is registered in the character row length memory 54. Since, in the initial state, nothing is registered in the character row length memory 54, the output of the X-memory 103 is zero. A line end signal 201 is outputted so that a first black mesh is set in the character row length memory 54. When the line end signal is generated on wire 201 (FIG. 9) the read/write address counter 104 of the character row length memory is cleared to zero so that the address 114 of the black mesh data memory is renewed by one.

When the first black mesh is registered in the character row length memory, the second black mesh has already been read out from the data memory, as has been described above. Then, their connections are checked. First, the relationship of the values of the Y-coordinate $Y_{in}$ and the character row Y are examined by a comparator 111. For $Y_{in} < Y$, the condition (3) of FIG. 10 is examined by means of a comparator 110. Specifically, an adder 107 makes a comparison of $Y_{in} + H > Y$ by adding the output of the $Y_{in}$ memory 73 and the output of the H memory 101. For $Y_{in} \geq Y$, the condition (2) of FIG. 10 is examined by means of a comparator 109. Specifically, a comparison of $Y + H_{in} > Y$ in is conducted by adding the output of the $H_{in}$ memory 71 and the output of the Y-memory 102 by means of an adder 106.

If the condition (2) or (3) of FIG. 10 is satisfied, a Y-coordinate connecting condition signal appears on wire 202 with the logical value "1".

Figure 11:
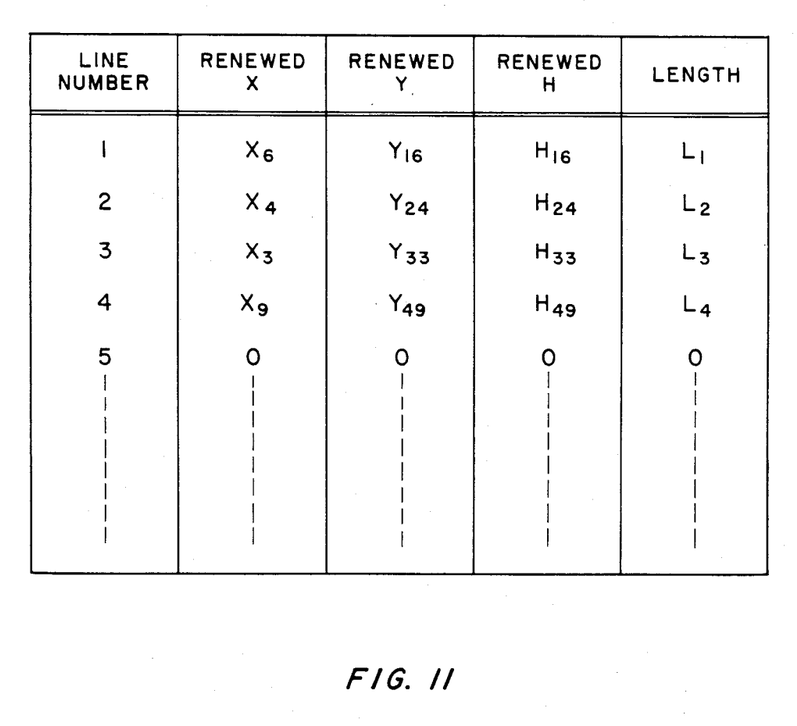
FIG. 11 is a diagram showing a generation table in a character row length memory of FIG. 6.

Next, the rightmost X-coordinate of the character row and the X-coordinate of a newly appearing black mesh are checked with respect to the condition (1) of FIG. 10 by means of a comparator 112. If the conditions (1) and (2) or (1) and (3) of FIG. 10 are satisfied, a character row connecting condition signal on wire 200 takes the logical value "1" so that the contents of the character row length memories 100, 101, 102 and 103 are renewed. The L-memory 100 counts and renews the length of the character row. The H-, Y- and X-memories 101 to 103 are registered with the data of the $H_{in}$-, $Y_{in}$- and $X_{in}$-memories 71, 73 and 75 as the newest black mesh data. The generation table in the character row length memories in the example of FIG. 8(a) is finally shown in FIG. 11. As shown, the four lines are registered, and their sum of $L_1 + L_2 + L_3 + L_4$ is outputted as the character row length in the example of FIG. 8(a).

Since the black bit number within the scanning area is noted, as has been described according to the present invention, the most proper slice level can be determined even if the background level varies in a complex manner. Due to the use of the data which are preapred by normalizing the black bit number in terms of the character row length, it is possible to provide a circuit which can determine the most proper slice level with variations in the number of characters contained in the scanning area.

Incidentally, the invention can be used in combination with either the dynamic slice level determining system within the microscopic area or with a plurality of level recognition circuit. These systems have been described hereinbefore as an example of the circuit according to the prior art. In this case, the advantages of the respective circuits provide a multiplied effect.

What is claimed is:

1. A binary character signal producing apparatus comprising:

means for scanning a predetermined scanning area on a document to produce a character signal having multi-levels;

means responsive to said character signal for measuring a character space in said predetermined scanning area;

means responsive to said character signal for counting the number of logical signals indicating character presence for each level of said multi-levels in said predetermined scanning area;

means for normalizing the number for each level in response to said measured character space to produce a normalized number for each level;

means responsive to said normalized number for each level for determining a slice level, the normalized number for said slice level corresponding to a predetermined reference number; and means for producing said binary character signal by slicing said character signal at said slice level.

2. A binary character signal producing apparatus comprising:

means for scanning a predetermined scanning area to produce a digital character signal, a plurality of meshes being arranged two-dimentionally in said predetermined scanning area, each of the plurality of meshes having multi-levels indicated by said digital signal;

character space detecting means responsive to said digital character signal for detecting a space of a character portion occupying said scanning area;

black bit number counting means responsive to said digital character signal for counting the number of meshes indicating character presence for each level of said multi-levels in said scanning area;

means for normalizing said number of meshes for each level delivered from said black bit number counting means in response to the output of said character space detecting means to deliver a normalized number for each level;

slice level determining means responsive to said normalized number for each level the normalized number for said slice level corresponding to a predetermined number; and a binary circuit for producing said binary character signal by slicing said digital character signal by said slice level.

3. A binary character signal producing apparatus comprising:

memory means for termporarily storing a multi-level pattern signal which is produced responsive to a scanning a predetermined scanning area;

slice means for slicing the output read out from said memory means at a reference level to output a first binary signal;

means for counting the number of black bits for each of a plurality of levels of said multi-level pattern signal, said black bits indicating character presence;

means for measuring a total length of characters contained in said predetermined scanning area in response to said first binary signal;

means for normalizing the number of black bits for each level in accordance with said total length of said characters to produce a normalized black bit number for each level;

means for determining a slice level in accordance with said normalized black bit number delivered from said normalizing means; and binary means for producing a binary character signal by slicing said multi-level pattern signal by said slice level.

4. A character recognition system for reducing the influence of background detail, the system comprising scanner means for optically scanning a scanning area for producing a multi-level signal, means responsive to said scanner means for measuring the length of a row of character signals, means for counting the number of black bits in said row of character signals at each of said multi-levels, normalizing means responsive to said counting means for normalizing the number of black bits at each of the respective levels in accordance with a character row length, first means responsive to said normalizing means for determing an optimal character slice level, second means also responsive to said counting means for judging the slice level of the background in said scanned area, and determining means jointly responsive to said first and second means for seleclting a slice level for maximizing said character signals and minimizing background signals.

5. The system of claim 4 wherein said black bit counting means comprises a slicer means for slicing the signal from said optical scanner at each of a plurality of levels, a plurality of counter means individually associated with each of said levels for counting the output signals from said slicer means at each of said individual levels, and clock controlled gating means individually associated with each of said levels for sequentially applying the output of said slicer means to the corresponding ones of said counter means.

6. A character recognition system for reducing the influence of background detail, the system comprising scanner means for optically scanning a scanning area for producing a multi-level signal, means responsive to said scanner means for measuring the length of a row of character signals, the means for measuring the length of said row of character signals comprises first shift register means responsive to said black bit counting means for storing signals responsive to one scanning period, second shift register means coupled to receive the output of said first shift register means, adder means for adding the output of said second shift register means to the input of said first shift register means, detector means responsive to the output of the first shift register means for detecting the length of a black mesh portion of one scanning operation, means responsive to said detector means for comparing the results of said detector with the results of a previous scan, means for counting the number of black bits in said row of character signals at each of said multi-levels, normalizing means responsive to said counting means for normalizing the number of black bits at each of the respective levels in accordance with a character row length, first means responsive to said normalizing means for determining an optimal character slice level, second means also responsive to said counting means for judging the slice level of the background in said scanned area, and determining means jointly responsive to said first and second means for selecting a slice level for maximizing said character signals and minimizing background signals.

7. The system of claim 6 further comprising means for comparing the connection between successive character signals to determine whether the readout signal is part of the same or a different row.

8. They system of claim 6 wherein said detector means comprises means for counting the length of successive black meshes, and means for counting the distances between said black meshes in X and Y directions.

9. The system of claim 8 further comprising means for storing a memory of the counts of length and of X and Y directions of one mesh, and comparing means responsive to the next counts for comparing said stored and next meshes to detect whether the rows of the meshes are the same or are different.

10. The sytem of claim 9 wherein said comparing means makes said detection responsive to whether the black mesh appears to be connected or disconnected.

* * * * *